(12) United States Patent
Fukai et al.

(10) Patent No.: US 6,307,729 B1
(45) Date of Patent: Oct. 23, 2001

(54) VACUUM CAPACITOR

(75) Inventors: Toshimasa Fukai, Shizuoka; Takamitsu Ito, Tokyo, both of (JP)

(73) Assignee: Kabushiki Kaisha Meidensha, Tokyo (JP)

(*) Notice: Subject to any disclaimer, the term of this patent is extended or adjusted under 35 U.S.C. 154(b) by 0 days.

(21) Appl. No.: 09/370,209

(22) Filed: Aug. 9, 1999

(30) Foreign Application Priority Data

Aug. 7, 1998 (JP) .................................................. 10-223902
Aug. 10, 1998 (JP) .................................................. 10-225077

(51) Int. Cl.$^7$ ............................ H01G 4/005; H01G 4/236
(52) U.S. Cl. ...................... 361/303; 361/306.1; 361/307
(58) Field of Search .................................. 361/301.3, 302, 361/303, 306.1, 307, 309, 313, 329, 330

(56) References Cited

U.S. PATENT DOCUMENTS

| | | | |
|---|---|---|---|
| 3,576,479 | * | 4/1971 | Oeschger .............................. 361/279 |
| 4,177,495 | * | 12/1979 | Perret ................................... 361/279 |

FOREIGN PATENT DOCUMENTS

| | | | |
|---|---|---|---|
| 5-41335 | * | 2/1993 | (JP) . |
| 5-41336 | * | 2/1993 | (JP) . |
| 5-267098 | * | 10/1993 | (JP) . |
| 5-326324 | | 12/1993 | (JP) . |
| 7-57975 | * | 3/1995 | (JP) . |
| 7-211588 | * | 8/1995 | (JP) . |
| 9-219342 | | 8/1997 | (JP) . |

* cited by examiner

*Primary Examiner*—Anthony Dinkins
(74) *Attorney, Agent, or Firm*—Foley & Lardner

(57) ABSTRACT

A vacuum capacitor and its manufacturing method are disclosed. The vacuum capacitor comprises: an insulating envelope; a pair of end electrodes, each end electrode being brazed under a non-oxidation atmosphere to a corresponding end of the insulating envelope and being formed together with the insulating envelope to constitute a vacuum vessel; a plurality of cylindrical electrode plates constituting a pair of cylindrical electrodes, each cylindrical electrode plate constituting one of the pair of cylindrical electrodes having a mutually different diameter and being extended along the insulating envelope from an inner surface of the corresponding one of the pair of end electrodes so as to be inserted into a space between the mutually adjacent cylindrical electrode plates constituting the other of the pair of cylindrical electrodes; and a positioning member to position one of the pair of cylindrical electrodes to the other of the pair of cylindrical electrodes in such a manner as to equalize a spatial interval between each cylindrical electrode plate constituting the one of the pair of cylindrical electrodes and that constituting the other of the pair of cylindrical electrodes.

11 Claims, 4 Drawing Sheets

VACUUM CAPACITOR

BACKGROUND OF THE INVENTION a) Field of the Invention

The present invention relates to a vacuum capacitor and its manufacturing method for the same, the vacuum capacitor being suitably used for an oscillation circuit of a high power transmitter, a high-frequency power supply of a semiconductor manufacturing device, or a tank circuit of an inductive heating device.

b) Description of the Related Art

A previously proposed vacuum capacitor includes an insulating envelope made of ceramics or glass having upper and lower ends to which upper and lower end electrodes each made of copper are hermetically sealed via upper and lower metal fittings so that a vacuum vessel is formed. A plurality of copper made, cylindrically shaped electrode plates of different diameters are extended vertically from an inner surface of the upper end electrode concentrically at equal intervals to form first cylindrical electrodes.

In addition, another plurality of copper made, cylindrically shaped electrode plates of different diameters are extended vertically from an inner surface of the lower end electrode and interposed between each of the first cylindrical electrodes to form second cylindrical electrodes.

It is noted that a hole is penetrated through a center portion of the upper end electrode to be used for exhausting air from the vacuum vessel described above, an exhaust tube made of copper is fitted around the hole, and an exhaust tube cover covers the exhaust tube is screwed into a tap hole installed on an outer surface of each end electrode.

Next, a previously proposed manufacturing method will be described below.

First, a plurality of concentrically arranged circular grooves are provided on the inner surface of the lower end electrode. Each cylindrical electrode plate constituting the second cylindrical electrode is mounted on the circular groove so that each cylindrical electrode plate is concentrically arranged. Thereafter, each cylindrical electrode plate is brazed or welded to the lower end electrode.

Thereafter, the metal fittings are conjoined to the respective ends of the insulating envelope.

Thereafter, another plurality of concentrically arranged circular grooves are formed on the inner surface of the upper end electrode. Each cylindrical electrode plate constituting the first cylindrical electrode is mounted on the circular groove so that each cylindrical electrode plate is concentrically arranged. At this time, the exhaust tube is fitted around the hole. The upper end electrode, each cylindrical electrode plate, and exhaust tube are brazed or welded.

Next, the insulating envelope with the respective metallic fittings are mounted on the inner surface of the lower end electrode having the cylindrical electrode and the inner surface of the upper electrode with the one metallic fittings having the cylindrical electrode and exhaust tube is mounted on the inner surface of the lower end electrode. Then, a plurality of jigs to concentrically arrange the end electrodes are fitted into the inner surface of the upper end electrode.

In this state, the brazing or welding is performed between the metal fitting and the upper end electrode and between the metallic fitting and the lower end electrode.

Next, a vacuum exhaust device is attached to the exhaust tube, a heat vacuum is performed with the vacuum vessel, and, thereafter, the exhaust tube is pinched to be hermetically sealed.

It is noted that the circular groove may not be provided on the lower end electrode and, in place thereof, a convex portion may be provided on a center portion of the inner side of the lower end electrode, a letter-U shaped portion which is bent in the inner side of a diameter direction is provided on a junction end between each cylindrical electrode plate constituting the second cylindrical electrode and the end electrode is provided, and each cylindrical electrode plate may concentrically be arranged so that the letter-U shaped portion is fitted to the convex portion and adjacent letter-U shaped portion. The same thing is applied equally well to the upper end electrode.

SUMMARY OF THE INVENTION

It is, however, necessary to carry out a heat evacuation (heat air exhausting) to render the vacuum vessel in the vacuum state for each of the previously proposed vacuum capacitors and manufacturing method described in the BACKGROUND OF THE INVENTION for the same.

This causes a prevention of the previously proposed vacuum capacitor from a mass production.

On the contrary, to produce a large quantity of the previously proposed vacuum capacitors, a large quantity of the heat evacuation (air exhaust) device are required. Furthermore, since the air exhaust tube and the exhaust tube covering are required, an installation limitation on the attachment of the vacuum capacitor is placed. In addition, although each of the first and second cylindrical electrodes is important to equalize the spatial intervals in their radial directions of the respective first and second cylindrical electrodes, it is also important to equalize the spatial intervals in their axial directions of the respective first and second cylindrical electrodes in terms of a performance of the vacuum capacitor.

It is therefore an object of the present invention to provide improved vacuum capacitor and manufacturing method for the same which are suitable for the mass production, are cost effective, do not receive the installation limitation, and can easily equalize the spatial intervals in the axial directions of the cylindrical electrodes.

The above-described object can be achieved by providing a vacuum capacitor comprising: an insulating envelope; a pair of end electrodes, each end electrode being brazed to a corresponding end of the insulating envelope and being formed together with the insulating envelope to constitute a vacuum vessel; a plurality of cylindrical electrode plates constituting a pair of cylindrical electrodes, each cylindrical electrode plate constituting one of the pair of cylindrical electrodes having a mutually different diameter and being extended along the insulating envelope from an inner surface of the corresponding one of the pair of end electrodes so as to be inserted into a space between the mutually adjacent cylindrical electrode plates constituting the other of the pair of cylindrical electrodes; and a positioning member to position one of the pair of cylindrical electrodes to the other of the pair of cylindrical electrodes in such a manner as to equalize a spatial interval between each cylindrical electrode plate constituting the one of the pair of cylindrical electrodes and that constituting the other of the pair of cylindrical electrodes.

The above-described object can also be achieved by providing a manufacturing method for a vacuum capacitor, comprising: a) brazing at least one of a pair of cylindrical electrodes to an inner surface of a corresponding one of a pair of end electrodes, the pair of end electrodes being attached on respective ends of an insulating envelope to form a vacuum vessel and each of the pair of cylindrical electrodes having a plurality of cylindrical electrode plates, each cylindrical electrode plate having a different diameter, being extended from the inner surface of the corresponding one of the pair of end electrodes, and being inserted into a space between the mutually adjacent cylindrical electrode plates constituting the other of the pair of cylindrical electrodes; b) provisionally assembling the vacuum capacitor with at least the other of the pair of end electrodes having the other of the pair of cylindrical electrodes provisionally mounted on the corresponding other of the respective ends of the insulating envelope via a brazing material; and c) heat brazing the provisionally assembled other of the pair of end electrodes to the corresponding one of the respective ends of the insulating envelope under a non-oxidization atmosphere to make an inner space of the vacuum vessel in a vacuum state.

DETAILED DESCRIPTION OF THE PREFERRED EMBODIMENTS

Reference will hereinafter be made to the drawings in order to facilitate a better understanding of the present invention.

Figure 1:
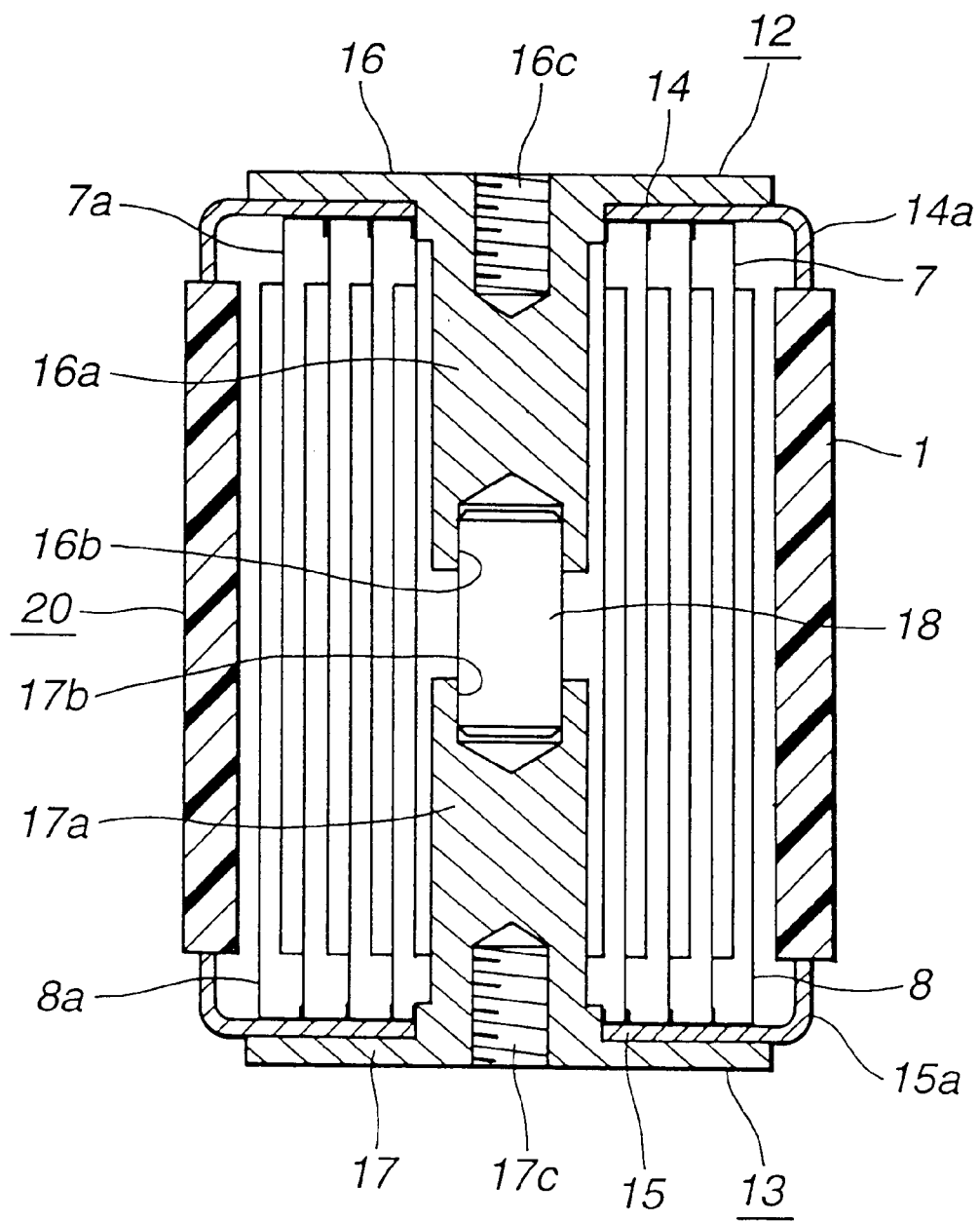
FIG. 1 is a longitudinal cross sectional view of a vacuum capacitor in a first preferred embodiment according to the present invention.

FIG. 1 shows a longitudinally cross sectional view of an vacuum capacitor of a vacuum type in a first preferred embodiment according to the present invention.

Figure 2:
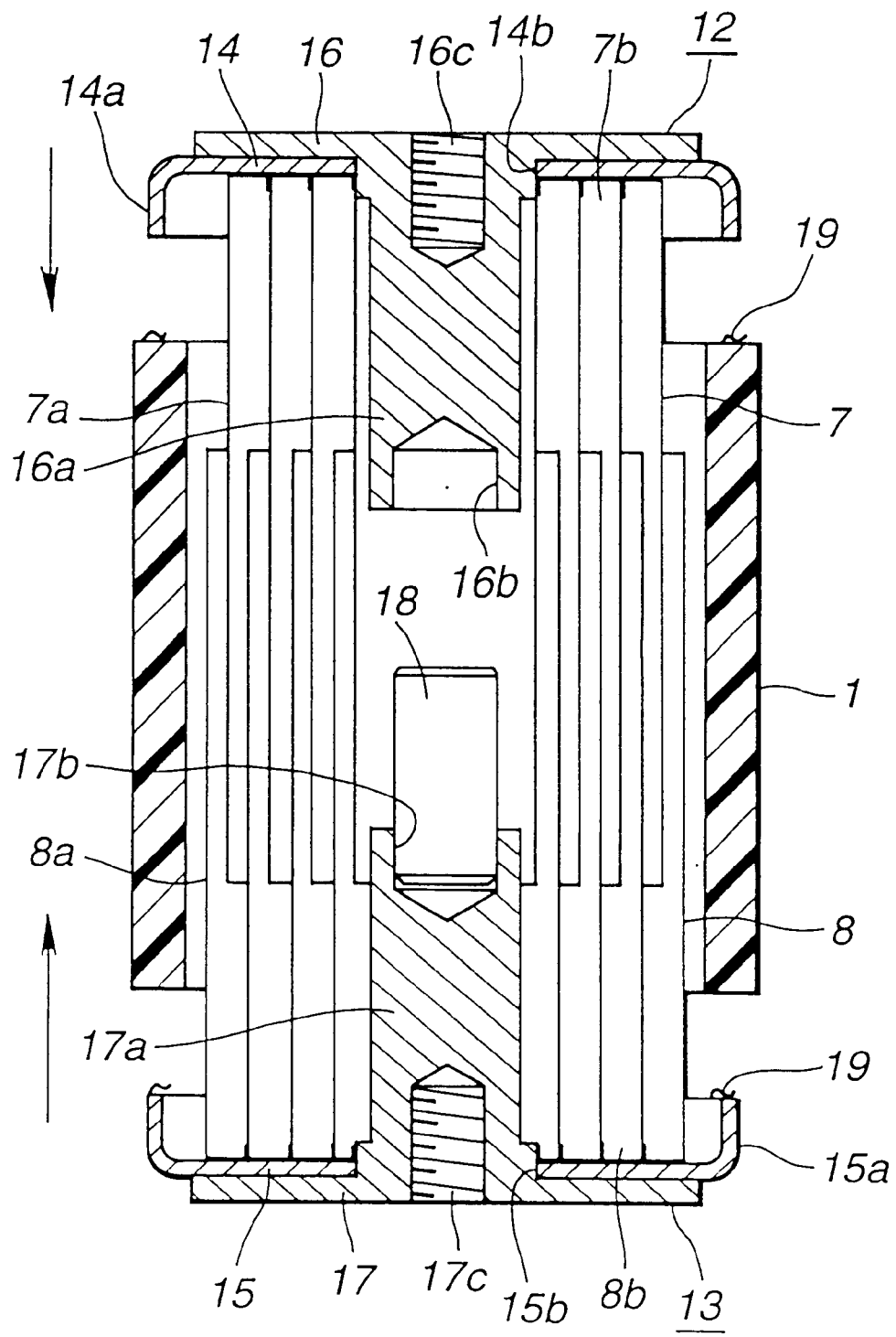
FIG. 2 is an explanatory view for explaining a manufacturing method for the vacuum capacitor shown in FIG. 1 in a first preferred embodiment according to the present invention.

FIG. 2 shows an explanatory view for explaining a manufacturing method for the vacuum capacitor shown in FIG. 1.

In FIGS. 1 and 2, each of a pair of upper and lower end electrodes 12 and 13 is made of copper. Each of the pair of end electrodes 12 and 13 is provided with: a circularly bent edge portion 14a and 15a at an outer peripheral end thereof; a flange portion 14 and 15 having a fitting hole 14b and 15b at a center portion thereof; a convex portion 16a and 17a projected from the fitting hole in an inward direction of a vacuum vessel; and an axial portion 16 and 17 having a tapped hole (screwed hole) 16c and 17c at a center of the axial portion on which an external connection conductor is attached and a positioning pin engagement hole 16b and 17b at the tip of the axial portion. It is noted that each of the flange portions 14 and 15 is integrated to the corresponding one of the axial portions 16 and 17 by means of a brazing and an insulating (e.g., ceramics) positioning pin 18 is engaged between the respective positioning pin engagement holes 16b and 17b. The positioning pin 18 is made of ceramics.

Next, the manufacturing method for the vacuum capacitor shown in FIG. 1 will be described below.

At a first step, each cylindrical electrode plate 7a and 8a constituting the corresponding one of the pair of cylindrical electrodes 7 and 8 is concentrically mounted on the inner surface of each flange portion 14 and 15 of the pair of cylindrical electrodes 7 and 8 via a brazing material and a heat brazing is carried out with the brazing material for brazing each cylindrical electrode plate 7a and 8a to the inner surface of each flange portion 14 and 15 under a non-oxidization atmosphere of any one of a vacuum atmosphere, an inert gas atmosphere, or hydrogen atmosphere.

In this case, a plurality of rails 7b and 8b having respective letter U-shapes of cross sections are extended concentrically junction ends of the end electrodes 11 and 12 at equal intervals between the respective rails 7b and 8b. Each U-shaped rail (portion) 7b and 8b receives the corresponding one of the plurality of cylindrical electrode plates 7a and 8a (That is to say, the corresponding one of the plurality of cylindrical electrode plates 7a and 8a is tightly fitted into each U shaped groove of the rails 7b and 8b). Thus, each cylindrical electrode plate 7a and 8a is mounted on the pair of end electrodes 11 and 12, the pair of cylindrical electrodes are concentrically attached to the respective flange portions 14 and 15 of the end electrodes 11 and 12.

At the next step (second step), one end surface of the insulating envelop 1 is mounted on an inner surface of the end electrode 13 to which one of the pair of cylindrical electrodes 8 is attached via a brazing material 19. Then, the inner surface of the end electrode 12 to which the other of the pair of cylindrical electrodes 7 is attached is mounted on the other end surface of the insulating envelope 1 via a brazing material.

Then, the insulating positioning pin 18 is engaged between each positioning pin arrangement hole 16b and 17b to provisionally assemble the vacuum capacitor as shown in FIG. 2.

At the next step (third step), each member of the provisionally assembled vacuum capacitor is inserted into a vacuum heat furnace so that a heat brazing is performed under a vacuum atmosphere.

Consequently, as shown in FIG. 1, the vacuum capacitor (the relative permitivity of vacuum $\epsilon_s=1.000$) is obtained. It is noted that a vacuum vessel 20 is constituted by the insulating envelope 1 and the end electrodes 12 and 13.

In the manufacturing method of the vacuum capacitor in the case of the first embodiment, the brazing step (third step) with the vacuum vessel evacuated is carried out within the vacuum heat furnace.

Consequently, a large quantity of the same vacuum capacitors can be manufactured as products.

In addition, the mass production becomes possible so that the costs of the manufacture can be reduced.

Furthermore, since the exhaust tube and exhaust tube covering described in the BACKGROUND OF THE INVENTION are unnecessary and no external projection is found in the vacuum capacitor in the first embodiment, no attachment limitation is present on the vacuum capacitor.

Since the positioning pin 18 is engaged between the end electrodes 12 and 13 during the second step, radial intervals of the cylindrical electrode plates 7a and 8a constituting the pair of cylindrical electrodes 7 and 8 can be equalized.

In the first embodiment of the manufacturing method for the vacuum capacitor, both of the pair of cylindrical electrodes 7 and 8 are brazed to the respective end electrodes 12 and 13 at the fist step.

As a second embodiment of manufacturing method for the vacuum capacitor, at the first step, only one of the pair of cylindrical electrodes 7 is only brazed to the upper one of the pair of end electrodes 12 when the vacuum capacitor is provisionally assembled. At the second step, each cylindrical electrode plate 8a constituting the one of the pair of cylindrical electrodes 8 is concentrically mounted on the one of the pair of end electrodes 13 to provisionally assemble the vacuum capacitor together with other members. Then, the heat brazing together with the other member is carried out.

Figure 3:
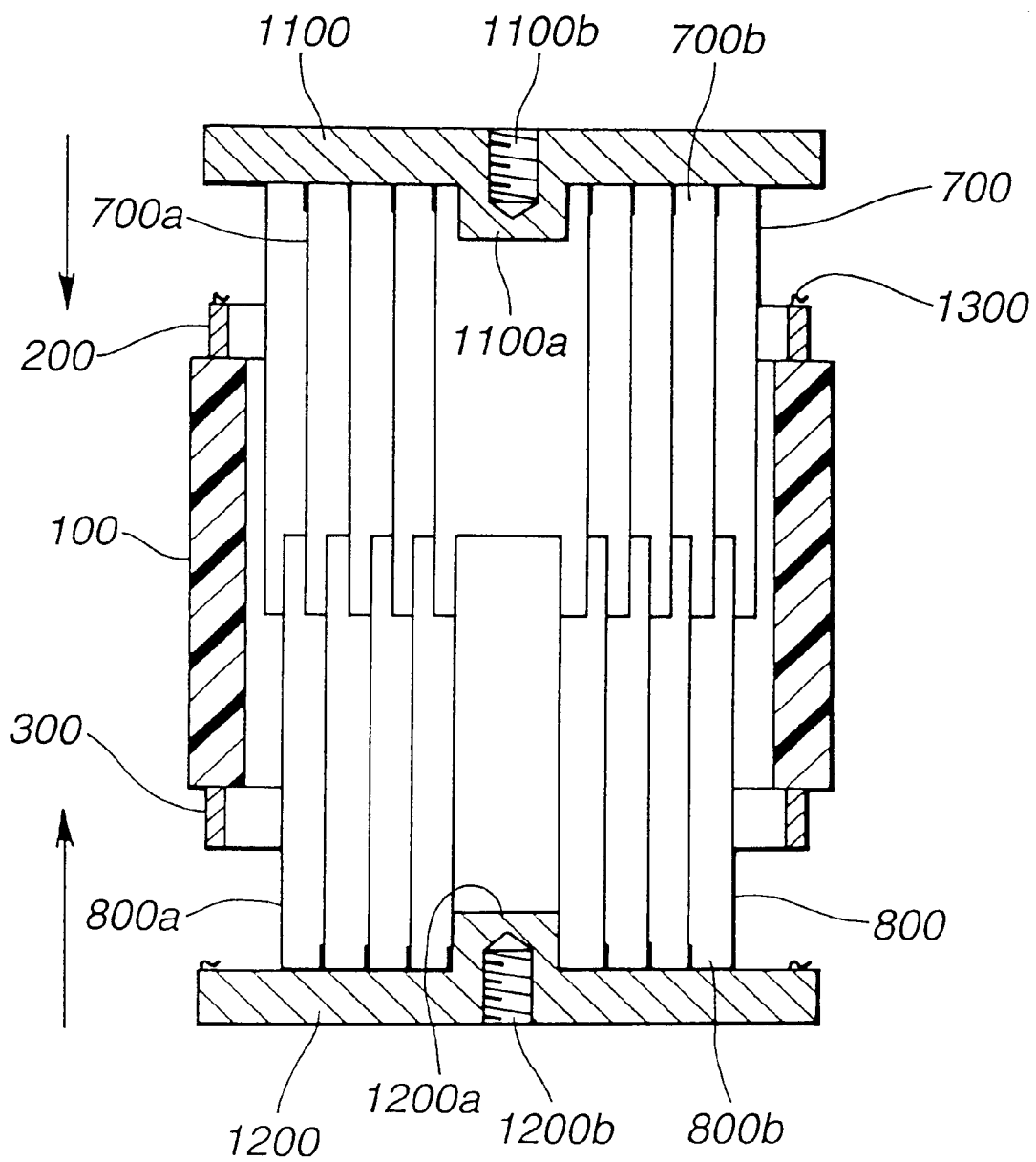
FIG. 3 is an explanatory view for explaining the manufacturing method for the vacuum capacitor in each of third and fourth preferred embodiments according to the present invention.

FIG. 3 shows an explanatory view for explaining the manufacturing method for the vacuum capacitor in a third preferred embodiment according to the present invention.

In the third embodiment shown in FIG. 3, a center portion of an inner surface of each of the pair of end electrodes 1100 and 1200 is provided with a convex portion 1100a and 1200a and another center portion of an outer surface of each of the pair of end electrodes 1100 and 1200 is provided with a screwed hole 1100b and 1200b by means of which an external connection conductor is attached.

First, at the first step, each cylindrical electrode plate 7a and 8a constituting the pair of cylindrical electrodes 7 and 8 is concentrically extended vertically from the corresponding inner surface of the respective end electrodes 1100 and 1200 and the heat brazing is carried out under the non-oxidization atmosphere of any one of the vacuum atmosphere, the inert gas atmosphere, or hydrogen atmosphere.

In this case, with letter-U shaped portions 700b and 800b mounted on the junction end portions of the end electrodes 1100 and 1200 of the respective cylindrical electrode plates 700a and 800a, the U-shaped portions 700b and 800b are fitted to a peripheral wall of the recess portion 1200a and its adjacent letter-U shaped portions 700b and 800b of the pair of end electrodes 1100 and 1200, respectively. Hence, the concentric arrangement of the cylindrical electrodes 700a and 800a on the end electrodes 1100 and 1200.

Next, at the second step, as shown in FIG. 9, one end of the insulating envelope 100, metal fittings 200 and 300 being joined to both ends of the insulating envelope 100, is mounted on the one inner surface of the pair of end electrodes 1200 having the one of the pair of cylindrical electrodes 800 via the brazing material and the other inner surface of the pair of end electrodes 1100 having the other of the pair of cylindrical electrodes 700 is mounted on the other end of the pair of end electrodes 1100 via the brazing material to provisionally assemble the vacuum capacitor.

The provisionally assembled members of the capacitor is inserted into the vacuum heat furnace and the heat brazing is carried out under the vacuum atmosphere.

Figure 4:
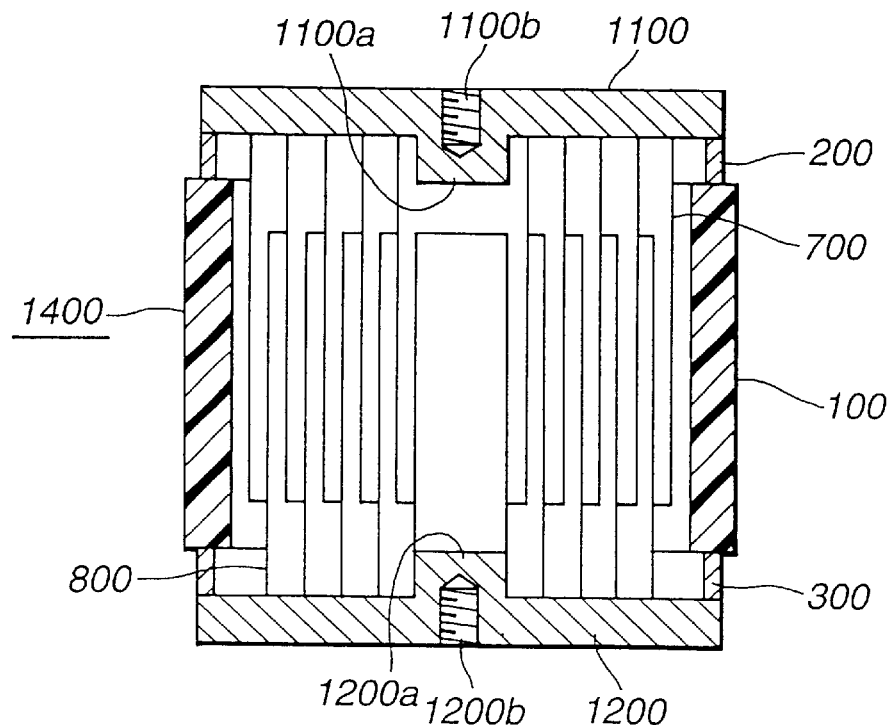
FIG. 4 is a longitudinal cross sectional view of the vacuum capacitor manufactured in the manufacturing method shown in FIG. 3.

Consequently, as shown in FIG. 4, the capacitor having the vacuum vessel 1400 an inner side of which is vacuum is obtained. The vacuum vessel 1400 is constituted by the insulating envelope 100, the metal fittings 200 and 300, and the end electrodes 1100 and 1200.

In the third embodiment, the step of brazing under the vacuum atmosphere is carried out within the vacuum heat furnace. A large quantity of the same vacuum capacitors can be manufactured one at a time. The mass production is possible and the cost of manufacture can be reduced. It is natural that the exhaust tube and the exhaust tube covering can be eliminated and no projection part is present.

Next, a fourth preferred embodiment of the manufacturing method for the vacuum capacitor will be described below.

In the third embodiment described above, the brazing of both of the pair of cylindrical electrodes 700 and 800 to both of the pair of end electrodes 1100 and 1200, respectively, is carried out at the first step.

In the fourth embodiment, only the brazing of the upper end electrode 1100 to the one of the pair of cylindrical electrodes 700 is carried out at the first step when the vacuum capacitor is provisionally assembled.

At the second step, the lower cylindrical electrode plates 800a constituting the other of the pair of cylindrical electrodes 800 are mutually concentrically mounted to provisionally assemble the vacuum capacitor with the other members. Then, the heat brazing is carried out together with the other members within the vacuum heat furnace.

The advantages in the fourth embodiment are the same as those in the third embodiment.

Figure 5A:
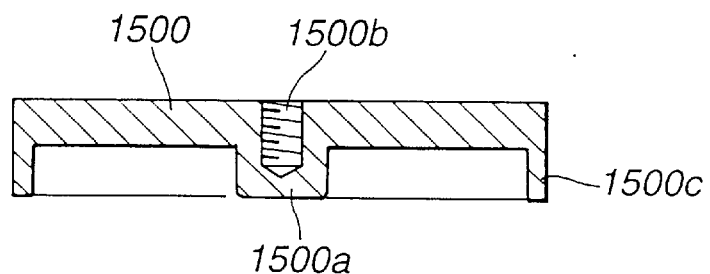
FIG. 5A is a longitudinal cross sectional view of an end electrode of the vacuum capacitor manufactured in a fifth preferred embodiment according to the present invention.
Figure 5B:
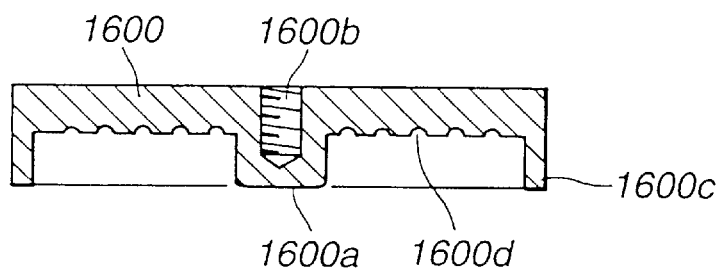
FIG. 5B is a longitudinal cross sectional view of the end electrode of the vacuum capacitor manufactured in a sixth preferred embodiment according to the present invention.

FIG. 5B shows a cross sectional view of one or each of the pair of end electrodes 1600 of the vacuum capacitor in a case of a sixth embodiment of the manufacturing method for the vacuum capacitor.

As shown in FIG. 5B, the end electrode 1600 is provided with the convex portion 1600a at the center of the inner surface thereof, the screwed hole 1600b at the center of the outer surface thereof, the circular projection 1600c at the peripheral end surface thereof, a plurality of circular grooves 1600d formed concentrically on the inner surface between the convex portion 1600a and the circular projection 1600c.

It is noted that the circular grooves 1600d serve as the positioning member when the respective cylindrical electrode plates 700a and 800a are mounted on the corresponding end electrodes. Hence, in the sixth embodiment, neither U-shaped portions 700b nor those 800b are required.

The entire contents of Japanese Patent Applications P10-223902 (filed in Japan on Aug. 7, 1998) and P10-225077 (filed in Japan on Aug. 10, 1998) are incorporated herein by reference.

Although the present invention has been described by reference to certain embodiments described above, the present invention is not limited to the embodiments described above. Modifications and variations of the embodiments will occur to those skilled in the art in light of the above teachings.

The scope of the present invention is defined with reference to the following claims.

What is claimed is:

1. A vacuum capacitor comprising:

an insulating envelope;

a pair of end electrodes, each end electrode being brazed to a corresponding end of the insulating envelope and being formed together with the insulating envelope to constitute a vacuum vessel;

a plurality of cylindrical electrode plates, each cylindrical electrode plate, constituting one of a pair of cylindrical electrodes, having a mutually different diameter and being extended along the insulating envelope from an inner surface of the corresponding one of the pair of end electrodes so as to be inserted into a space between the mutually adjacent cylindrical electrode plates constituting the other of the pair of cylindrical electrodes; and a positioning member to position one of the pair of cylindrical electrodes to the other of the pair of cylindrical electrodes in such a manner as to equalize a spatial interval between each cylindrical electrode plate and wherein each of the pair of end electrodes is formed substantially in a letter T shape of cross section and wherein the positioning member comprises a plurality of circular U-shaped rails extended concentrically at equal spatial intervals and vertically on the inner surface of each of the pair of end electrodes, each circular U-shaped rail receiving the corresponding one of the cylindrical electrode plates of each of the pair of cylindrical electrodes.

2. A vacuum capacitor as claimed in claim 1, further comprising a pair of metal fittings, each metal fitting being extended from a corresponding one of end surfaces of the insulating envelope and being brazed to a peripheral end of the corresponding one of the pair of end electrodes.

3. A vacuum capacitor as claimed in claim 1, wherein the positioning member comprises an insulating positioning pin disposed in a space between the pair of end electrodes and engaged to each end electrode.

4. A vacuum capacitor as claimed in claim 3, wherein each of the end electrodes is provided with a convex portion projected toward the vacuum vessel from the inner surface of the corresponding one of the end electrodes, a tip of the convex portion having an engagement hole via which the positioning pin is engaged to the corresponding one of the end electrodes.

5. A vacuum capacitor as claimed in claim 4, wherein a connection portion is provided with an outer surface of the corresponding one of the end electrodes, the connection portion being used to connect the corresponding one of the electrodes to an external connection conductor.

6. A vacuum capacitor as claimed in claim 5, wherein each end electrode is formed integrally with an axial portion having the corresponding one of the engagement holes and a flange portion on which the corresponding one of the cylindrical electrodes is attached.

7. A vacuum capacitor as claimed in claim 6, wherein the connection portion of each of the end electrodes comprises a screwed hole extended vertically from a center of the outer surface of the axial portion and being concentric to the engagement hole in which the positioning pin is adjustably inserted.

8. A vacuum capacitor as claimed in claim 7, further comprising a pair of metal fittings each of the metal fittings having one end brazed to a corresponding end surface of the insulating envelope, having a hole for the corresponding one of the metallic fittings penetrated through the axial portion of the corresponding one of the end electrodes, and from an inner surface of which the corresponding cylindrical electrodes plates are extended at the mutually equal spatial intervals.

9. A vacuum capacitor as claimed in claim 8, wherein the end of each metallic fitting is brazed to the corresponding end surface of the insulating envelope under a heat brazing process to make the vacuum vessel in a vacuum state.

10. A vacuum capacitor as claimed in claim 3, wherein the positioning pin is formed of ceramics.

11. A vacuum capacitor comprising:

an insulating envelope;

a pair of end electrodes, each end electrode being brazed to a corresponding end of the insulating envelope and being formed together with the insulating envelope to constitute a vacuum vessel;

a plurality of cylindrical electrode plates, each cylindrical electrode plate, constituting one of a pair of cylindrical electrodes, having a mutually different diameter and being extended along the insulating envelope from an inner surface of the corresponding one of the pair of end electrodes so as to be inserted into a space between the mutually adjacent cylindrical electrode plates constituting the other of the pair of cylindrical electrodes; and a positioning member to position one of the pair of cylindrical electrodes to the other of the pair of cylindrical electrodes in such a manner as to equalize a spatial interval between each cylindrical electrode plate, wherein each of the pair of end electrodes is formed in substantially a letter T shape of cross section and wherein the positioning member comprises a plurality of circular grooves formed concentrically at equal spatial intervals on the inner surface of at least one of the pair of end electrodes, each circular groove receiving the corresponding one of the cylindrical electrode plates of the corresponding one of the pair of cylindrical electrodes.

* * * * *